UNITED STATES PATENT OFFICE.

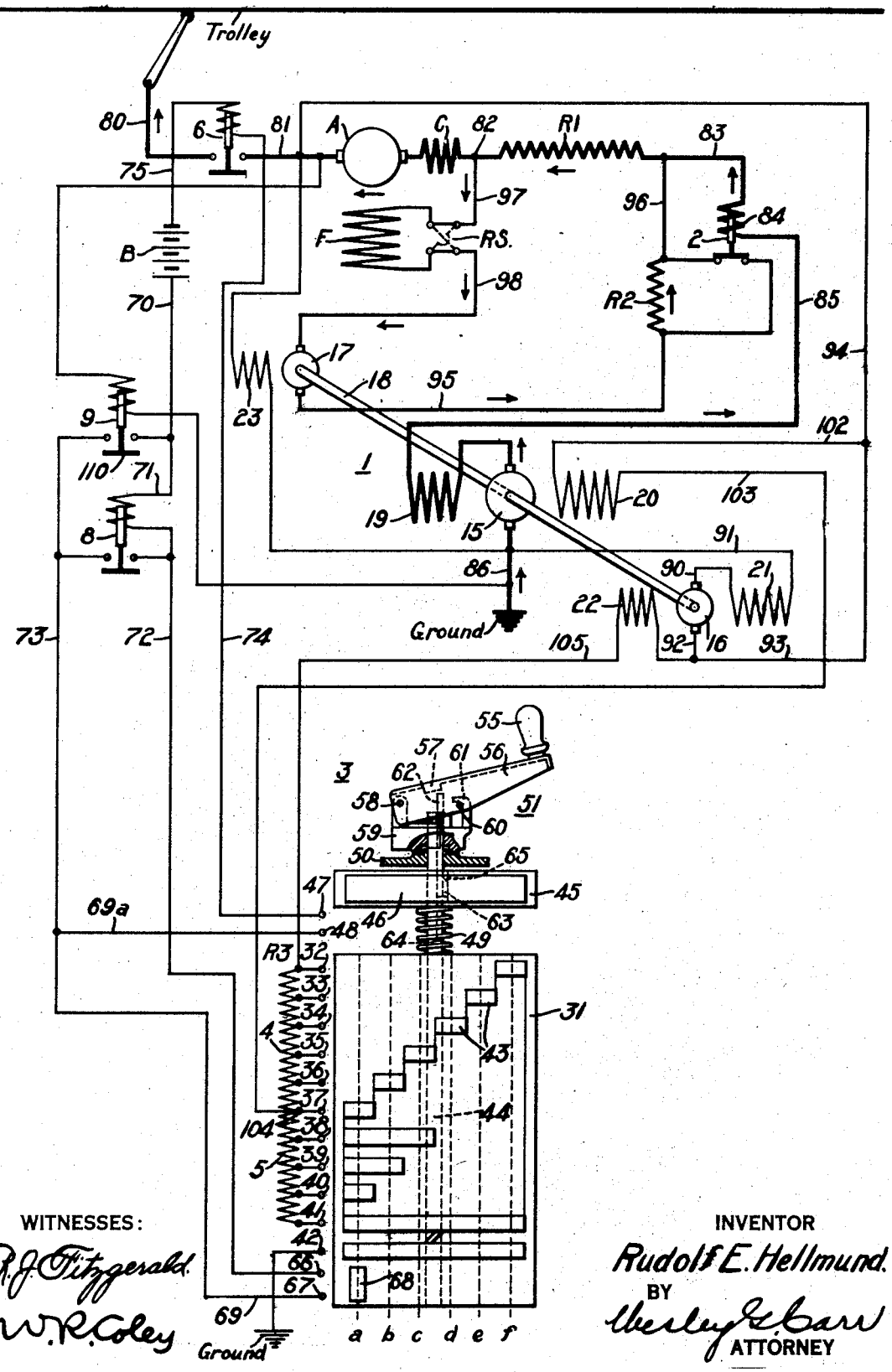

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,326,341.      Specification of Letters Patent.      Patented Dec. 30, 1919.

Application filed April 18, 1917. Serial No. 162,969.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the control of dynamo-electric machines that are adapted for both accelerating and regenerating operation.

One object of my invention is to provide a relatively simple manually-controlled system of the above-indicated character wherein a controlling device is movable in opposite directions in accordance with the type of machine operation and, in addition, an operating mechanism, preferably of the "dead-man's release" type, is provided for varying the circuit connections under predetermined conditions.

Other minor objects of my invention will be evident from the following detailed specification and are set forth in the appended claims.

My invention may best be understood by reference to the accompanying drawing the single figure of which is a diagrammatic view of a system of control arranged and governed in accordance with the invention.

Referring to the drawing, the system shown comprises suitable supply-circuit conductors respectively marked "Trolley" and "Ground"; a main dynamo-electric machine that is adapted for both accelerating and regenerating operation and is provided with a main or exciting field winding F and an auxiliary or commutating field winding C; a reversing switch RS, here conventionally illustrated, for the usual purpose of reversing the direction of rotation of the main armature A; a main-circuit resistor R1 and auxiliary-circuit resistors R2 and R3 for purposes to be set forth; an auxiliary motor-generator or booster set 1 that is driven from the supply circuit and is employed, among other things, to excite the main field winding F; a high-current relay device 2 for normally short-circuiting the resistor R2; a manually-operated controller 3 for manipulating the circuit connections of sections 4 and 5 of the resistor R3; a main-circuit switch 6; a suitable auxiliary source of energy, such as a battery B; an auxiliary-current relay 8 for governing the main-circuit switch 6 during acceleration and a machine-voltage relay 9 for effecting a similar function during regeneration.

The motor-generator or booster set 1 comprises a driving or motor armature 15; a generating armature 16 for returning energy to the supply circuit; and an exciting armature 17 for energizing the main field winding F, all of the auxiliary armatures being mechanically connected in any suitable manner, as by a shaft 18. The auxiliary motor armature 15 is provided with a series-related field winding 19 and with a shunt field winding 20 that is connected in circuit with the section 5 of the resistor R3 and the excitation whereof is gradually decreased as the controller 3 is moved in a forward direction. The generating armature 16 is likewise provided with a series-related field winding 21 and with a shunt field winding 22 that is connected in circuit with the section 4 of the auxiliary resistor R3 and the excitation whereof is gradually increased as the controller 3 is forwardly actuated. The exciting armature 17 is shown as provided with a field winding 23 that is connected across the supply circuit.

The manually-operated controlling device 3 comprises a main drum portion 31 that is adapted to occupy operative positions *a* to *f*, inclusive; a plurality of stationary control fingers 32 to 41, inclusive, that are connected to different points of the resistor R3; and a contact segment 43 that is mounted upon the drum 31 for the purpose of engaging various control fingers to vary the excitation of the shunt field windings for the motor and the generator armatures of the booster set 1, in a manner to be described.

The centrally located operating shaft 44 for the main drum portion 31 also carries an upper auxiliary drum 45, which is slidably movable thereon and upon which is mounted a contact segment 46 that bridges a pair of stationary control fingers 47 and 48 whenever the controller 3 is in active operation. Normally, a helical spring 49, or its equivalent, which incloses an intermediate portion of the operating shaft 44, biases the auxiliary drum portion 45 to the illustrated upper position. The shaft 44 extends upwardly through the customary top cover member 50 of the controller and is mechanically associated with a "dead-man's release" handle 51, as about to be set forth, the spring 49 also normally maintaining the mechanism 51 in the illustrated upper position whenever the train operator removes his hand from the operating handle.

The "dead-man's release" mechanism 51 may be of any well-known type and is here shown as comprising a grip or handle 55 that is mounted upon a suitable channel member or bar 56 having an interior lug or projection 57, for a purpose to be set forth, and also having a pivotal connection 58 with a base portion 59 that is secured to the upper end of the operating shaft 44 to effect rotative movement thereof. The limit of upward movement of the handle is fixed by means of a pin 60 forming a part of the channel or bar 56, which pin engages a suitable hook or extension 61 of the base portion 59. A key or feather 62, having an enlarged lower portion or wing 63, is adapted to slide within a longitudinal slot 64 of the operating shaft 44, while the wing 63 is located within a pocket or recess 65 of the auxiliary drum 45 and thus transmits the rotative movement of the shaft 44 to the drum 45.

The mechanical operation of the "dead-man's release" handle 51, without regard to the electrical connections completed thereby, may be set forth as follows: Upon the application of downward pressure by the train operator to the grip 55, the interior lug 57 engages the upper end of the feather 62, which is thereby caused to slide downwardly within the shaft slot 64 and carry the auxiliary drum 45 downwardly with it, against the action of the biasing spring 49. Rotative movement of the handle then causes corresponding movement of both the main drum 31 and the auxiliary drum 45 and, in particular, the auxiliary drum occupies such a position that the contact segment 46 bridges the stationary control fingers 47 and 48 to actively govern the control circuits, as subsequently described. On the other hand, as soon as the pressure upon the grip 55 is relieved, the spring 49 actuates the entire "dead-man's release" mechanism to the illustrated upper position, which immediately effects the disengagement of the contact segment 46 from the stationary control fingers 47 and 48 and, consequently, any further rotative movement of the controller 3 in either direction, while also causing rotative movement of the main drum 31 and the auxiliary drum 45, will not actively control the main circuits. Such control can be accomplished only by again actuating the mechanism to the lower position.

Assuming that the controller 3 is actuated in the above-described manner to the initial operative position $a$, an auxiliary circuit is established from the positive terminal of the battery B through conductors 70 and 71, the actuating coil of the relay 8, conductor 72, control fingers 66 and 67, which are bridged by contact segment 68 only in the first position $a$ of the controller 3, conductors 69 and 69a, control fingers 48 and 47, which are bridged by contact segment 46 of the auxiliary drum 45 in its lower or active position, conductor 74, the actuating coil of the main circuit switch 6 and conductor 75 to the opposite battery terminal.

A "holding" circuit is completed, as soon as the relay 8 has closed, from the conductor 72 through the coöperating contact members of the relay and conductor 73 to the conductor 69a, whereby the switch 6 is maintained closed until the "dead-man's release" mechanism opens, irrespective of the controller position.

In this way, the main-circuit switch 6, or any other switches desired, may be closed to complete a main circuit from the Trolley through conductor 80, switch 6, conductor 81, main armature A, commutating field winding C, junction-point 82, main circuit or stabilizing resistor R1, conductor 83, actuating coil 84 for the high-current relay device 2, conductor 85, series-related field winding 19 and armature 15 of the auxiliary driving motor, and conductor 86 to the negative supply-circuit conductor Ground. The auxiliary motor armature 15 is thus initially connected in series-circuit relation with the main armature A to effect a gradual increase of that portion of the supply-circuit voltage which is impressed upon the main armature A during acceleration, as subsequently described.

One terminal of the generating armature 16 is connected through conductor 90, series field winding 21 and conductor 91 to the ground conductor 86 while the other terminal is connected through conductors 92, 93 and 94 to the supply-circuit terminal of the main armature A. Thus, the energy not required for actual losses in the main armature A and the auxiliary motor-generator 1 may be returned to the supply circuit or fed back into the main armature circuit and thus effect economy of operation, since accelerating resistors are eliminated.

The main-field-winding circuit is established from the positive terminal of the exciting armature 17 through conductor 95, normally short-circuited resistor R2, conductor 96, main-circuit resistor R1, conductor 97, reversing switch RS and main field winding F, and conductor 98 to the negative armature terminal.

One auxiliary field-winding circuit is completed from the trolley-energized conductor 94 through conductor 102, shunt field winding 20 for the auxiliary driving motor, conductor 103, intermediate tap-point 104 of the resistor R3, control fingers 37 and 42, which are bridged by contact segment 43 of the controller 3 in its initial position *a* and thence to Ground.

A further auxiliary field-winding circuit is completed from conductor 94 through conductor 93, shunt field winding 22 for the generating armature 16, conductor 105, the entire section 4 of the resistor R3, and thence, through intermediate tap-point 104, to Ground, as just described.

By actuating the controller 3 through its successive positions in the forward direction, the control fingers 40, 39 and 38 successively become disengaged from the contact segment 43 to gradually insert resistance in circuit with the field winding 20 for the auxiliary driving-motor armature 15 and thereby decrease the value of voltage absorbed by the auxiliary driving motor, which decrease is accompanied by a corresponding increase of the voltage impressed upon the terminals of the main armature A to effect acceleration thereof.

Furthermore, control fingers 37 to 33, inclusive, successively engage and disengage the contact segment 43, with the result that the excitation of the field winding 22 for the generating armature 16 is gradually strengthened, while a still greater value of resistance is inserted in circuit with the auxiliary motor field winding 20. Consequently, in this way also, the voltage of the main armature A is increased while the voltage of the auxiliary driving motor armature 15 is reduced. In the final controller position *f*, substantially full supply-circuit voltage is impressed upon the main armature.

Upon the release of downward pressure from the "dead-man's handle" 51, the mechanism is lifted to the illustrated upper position in the manner previously described, and the resultant interruption of the auxiliary circuit between the control fingers 47 and 48 causes the deënergized switch 6 to open, thus disconnecting the main machine from the supply circuit and allowing "coasting." At this time, also, the starting switch 8 automatically opens, in readiness for the next control operation.

To subsequently effect regenerative operation, the "dead-man's handle" 51 is returned to its lower position and is rotatably moved in the opposite or backward direction, whereby the generated voltage of the momentum-driven main armature A gradually increases to a value preferably slightly above the supply-circuit voltage and corresponding to the setting of the voltage relay 9, which thereupon lifts to close the circuit between conductors 70 and 73 by means of auxiliary contact members 110. Thus, the main-circuit 6 is closed and the main machine is connected to the supply circuit to return energy thereto.

The current-stabilizing function of the main-circuit resistor R1 is fully set forth in my co-pending application, Serial No. 44,443, filed August 9, 1915, Patented Apr. 1, 1919, No. 1,298,706, and only a brief exposition thereof will be necessary in the present instance. As indicated by the various arrows, the main armature or regenerated current traverses the resistor R1 in the same direction as the exciting current that is supplied to the main field winding F by the auxiliary armature 17. Consequently, upon an incipient increase of regenerated current in the main armature A, the correspondingly increased voltage drop across the resistor R1 immediately and inherently reduces the exciting voltage available for delivery to the main field winding, since the resistor R1 is also included in circuit with the field winding. Thus, the main-machine excitation is reduced to effect a corresponding decrease of regenerated current to the normal value. Conversely, an incipient decrease of main-armature current produces an inherent increase of main-field-winding excitation and a corresponding rise in the regenerated current.

In some cases, the speed of the vehicle during the coasting period, for instance, when the car is traveling down a grade, may materially increase, and the above-described regenerative connection of the machines to the supply circuit will produce a relatively heavy initial regenerative current unless some provision is made to prevent such an occurrence. In the present instance, I obviate the above-mentioned difficulty by means of the high-current relay device 2, which lifts when its actuating coil 84 is energized by a predetermined relatively heavy regenerative current to insert the resistor R2 in circuit with the exciting armature 17 and the main field winding F, thereby reducing the main-machine excitation and correspondingly decreasing the main armature or regenerated current.

It will be understood that the principles of my present invention are applicable to various systems other than that shown and, furthermore, that various modifications of the circuit connections herein set forth may be made without departing from the spirit and scope of my invention. I desire, therefore, that only such limitations shall be imposed as are indicated in the appended claims:

I claim as my invention:

1. In a system of control, the combination with a supply circuit and a dynamo-electric machine adapted for both accelerating and regenerating operation, of a controlling device manually movable in opposite directions in accordance with the type of machine operation, means associated with said controlling device for automatically changing circuit connections under predetermined manual operating conditions of the device, and means for automatically restoring said circuit connections under predetermined electrical operating conditions of the machine.

2. In a system of control, the combination with a supply circuit and a dynamo-electric machine adapted for both accelerating and regenerating operation, of a controlling device movable in opposite directions through the same positions in accordance with the type of machine operation, actuating means mechanically associated with said controlling device for automatically changing circuit connections under predetermined manual release conditions, and relay means for automatically restoring said circuit connections under predetermined machine-voltage conditions.

3. In a system of control, the combination with a supply circuit and a dynamo-electric machine adapted for both accelerating and regenerating operation, of a controller movable in opposite directions to effect the respective types of machine operation, a "dead-man's release" mechanism for permitting "coasting" of said machine between the opposite movements of said controller, and relay means for automatically restoring said circuit connections under predetermined machine-voltage conditions.

4. In a system of control, the combination with a supply circuit and a dynamo-electric machine adapted for both accelerating and regenerating operation, of a controller movable in opposite directions through the same positions to effect the respective types of machine operation, and a "dead-man's release" mechanism for disconnecting said machine from the supply circuit to permit machine "coasting" after the accelerating period with the mechanism in one position and for arranging the machine circuits to permit regeneration under certain machine voltage conditions with the mechanism in a second position.

5. In a system of control, the combination with a supply circuit and a dynamo-electric machine adapted for both accelerating and regenerating operation, of a multi-position reversible controller, means, including a "dead-man's release" mechanism, for connecting the machine to the supply circuit while said mechanism is depressed during the accelerating period, and an arrangement of circuits to effect machine acceleration upon "forward" movement of said controller by said mechanism and to effect regenerative machine operation upon "backward" movement of the controller, the release and subsequent depression of said mechanism prior to said "backward" movement respectively serving to allow machine "coasting" and to arrange certain circuits to permit regeneration under proper machine voltage conditions.

6. In a system of control, the combination with a supply circuit and a dynamo-electric machine adapted for both accelerating and regenerating operation, of a controlling device manually movable in opposite directions in accordance with the type of machine operation, means associated with said controlling device for automatically changing circuit connections under predetermined manual-release conditions of said device, means for automatically restoring said circuit connections under predetermined machine-voltage conditions, and means for preventing predetermined abnormal conditions upon said restoration.

7. In a system of control, the combination with a supply circuit and a dynamo-electric machine adapted for both accelerating and regenerating operation, of a controller movable in opposite directions through the same positions to effect the respective types of machine operation, a "dead-man's release" mechanism for disconnecting said machine from the supply circuit to permit machine coasting after the accelerating period, with the mechanism in one position, and for arranging the machine circuits to permit regeneration under certain machine voltage conditions, with the mechanism in a second position, and means for preventing a relatively heavy initial regenerative current.

8. In a system of control, the combination with a supply circuit and a dynamo-electric machine adapted for both accelerating and regenerating operation, of a multi-position reversible controller, means, including a "dead-man's release" mechanism, for connecting the machine to the supply circuit while said mechanism is depressed during the accelerating period, an arrangement of circuits to effect machine acceleration upon "forward" movement of said controller by said mechanism and to effect regenerative machine operation upon "backward" movement of the controller, the release and subsequent depression of said mechanism prior to said "backward" movement respectively serving to allow machine "coasting" and to arrange certain circuits to permit regeneration under proper machine voltage conditions, and relay means connected in circuit with said armature to prevent a relatively heavy initial regenerative current.

9. In a system of control, the combination with a supply circuit and a dynamo-electric machine adapted for both accelerating and regenerating operation, of a multi-position reversible controller, means, including a "dead-man's release" mechanism, for connecting the machine to the supply circuit while said mechanism is depressed during the accelerating period, an arrangement of circuits to effect machine acceleration upon "forward" movement of said controller by said mechanism and to effect regenerative machine operation upon "backward" movement of the controller, the release and subsequent depression of said mechanism prior to said "backward" movement respectively serving to allow machine "coasting" and to arrange certain circuits to permit regeneration under proper machine voltage conditions, relay means for automatically completing said certain circuits, and other relay means connected in circuit with said armature to automatically prevent relatively heavy initial regenerative current.

In testimony whereof, I have hereunto subscribed my name this 30th day of March, 1917.

RUDOLF E. HELLMUND.